United States Patent [19]

Gaeckle

[11] 4,271,947
[45] Jun. 9, 1981

[54] THERMAL FUZE MECHANICAL DISCONNECT EUTECTIC CONTAINMENT

[75] Inventor: Fred J. Gaeckle, Erie, Pa.

[73] Assignee: General Electric Company, Wilmington, Mass.

[21] Appl. No.: 960,023

[22] Filed: Nov. 13, 1978

[51] Int. Cl.$^3$ .................................................. F16D 11/00
[52] U.S. Cl. ................................ 192/82 T; 64/28 R; 192/56 R
[58] Field of Search .......................... 192/82 T, 56 R; 64/28 R

[56] References Cited

U.S. PATENT DOCUMENTS

| | | | |
|---|---|---|---|
| 2,314,227 | 3/1943 | Lieberherr | 192/82 T X |
| 3,212,613 | 10/1965 | Carlson | 192/82 T X |
| 3,675,444 | 7/1972 | Whipple | 64/28 R |
| 3,889,789 | 6/1975 | Boehringer | 192/82 T |
| 4,086,991 | 5/1978 | Swadley | 192/82 T |

Primary Examiner—Philip C. Kannan
Attorney, Agent, or Firm—I. David Blumenfeld

[57] ABSTRACT

A rotary drive shaft disconnect mechanism which mechanically joins two aligned shafts and which disconnects them in response to the overheating of an eutectic metallic element. This mechanism utilizes a fuze of the type which is composed of a multiple number of structural wires which are maintained in position by the eutectic matrix. The heating of the eutectic matrix removes the lateral or side support from the wires permitting collapse of the eutectic element. The eutectic element is contained within a predetermined cavity within the drive shaft, and is prevented from escaping and contaminating oil which is in the region of the output spline of the shaft. When the shaft is disconnected, a flange moves against a seal to prevent any escape of eutectic material from the region of the shaft and into the cooling oil.

6 Claims, 2 Drawing Figures

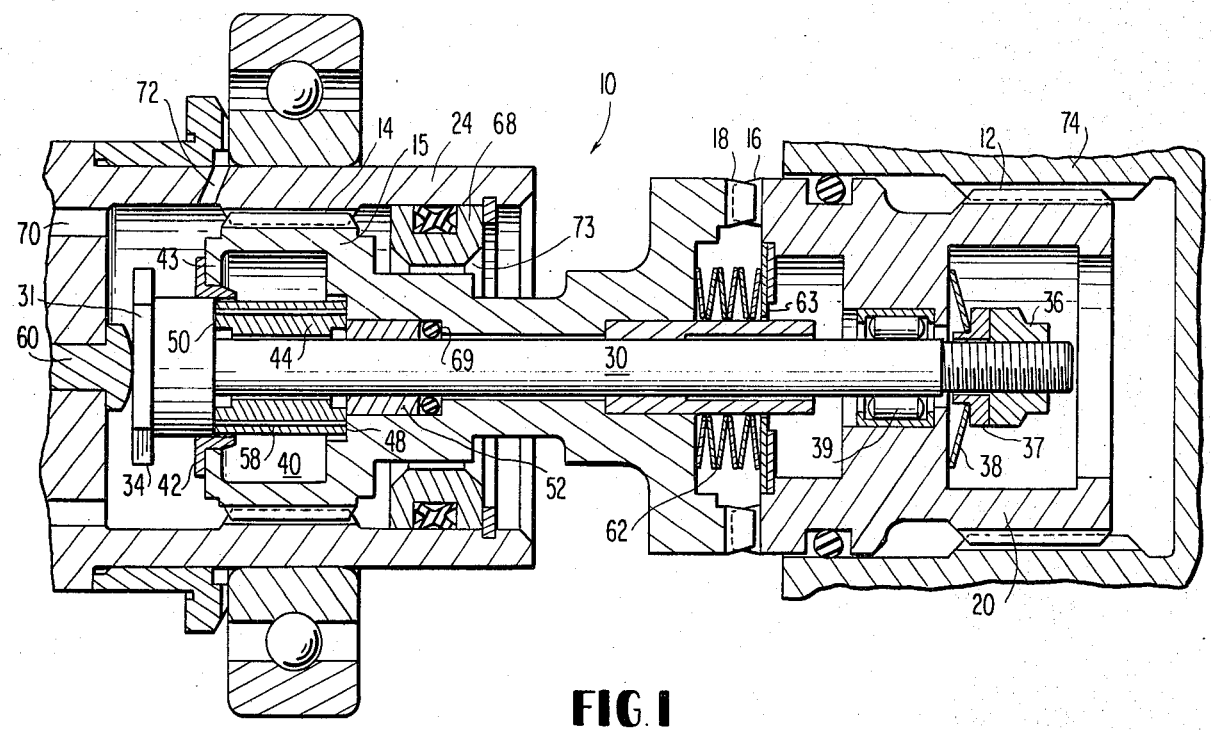
FIG.1
FIG.2
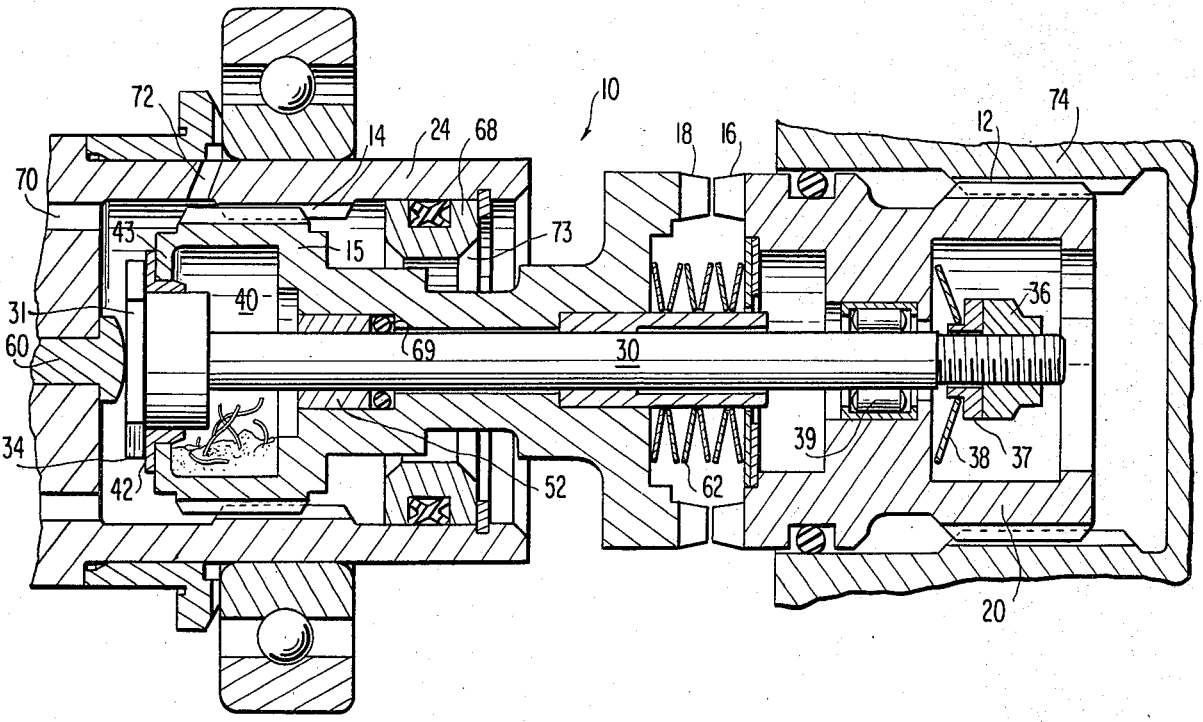

THERMAL FUZE MECHANICAL DISCONNECT EUTECTIC CONTAINMENT

BACKGROUND OF THE INVENTION

In the design of auxilliary equipment for use on aircraft engines, such as variable speed, constant frequency generators and hydraulic pumps, it has been the practice of engine designers to require separate lubrication systems for such auxilliary equipments. The reason for this requirement is that any contamination of the jet engine lubrication system could lead to catastrophic failure, and very expensive maintenance procedures on the engine itself.

Heretofore, it has been the practice of the industry to require separate lubricating systems for aircraft auxilliary equipments in order to provide absolute assurance that there will be no contamination of the engine oil when auxilliary equipments overheat, or fail during service use. This procedure, however, has required the use of a secondary cooling and lubricating system which necessarily requires additional weight and additional complexity in the layout of the engine compartment. Even with separate oil systems, there is the danger that the failure of one generator or pump will induce failure of other auxilliary equipment on the same supply system.

Heretofore, eutectic disconnect shafts such as that illustrated in U.S. Pat. No. 3,889,789 have been utilized to protect engines and auxilliary equipments in the event of failure and overheating. In these systems, a eutectic element is responsive to the surrounding heat and this eutectic element melts, permitting collapse of the element because of loss of lateral support for wires which pass through the element.

In the thermal fuze mechanical disconnect illustrated in the '789 patent, there is no provision for the flow of lubricating and cooling oil across the splines 26 which connect the drive shaft to the torque receiving means or pump drive shaft 24. In this arrangement, there is a hole 60 which communicates with the diametral bore 40 in which the thermal fuze is positioned. This allows some melted eutectic material to flow into the radial portion 42 of the cap 34. As can be seen in FIG. 2, the radial portion of cap 34 is also in direct communication with the area around the splines which connect the drive shaft to the torque receiving means. Therefore, the eutectic material is free to pass the area of the splines, and, if any engine lubricant is present, it will contaminate the engine lubricant and consequently endanger the operation of the entire engine.

Still further, as can be seen in FIGS. 1 and 2, there is a substantial space between the cap member 34 and the inner walls of the driven end of the drive shaft which carries the splines. This provides yet another means of escape of the melted eutectic material into the region of the splines.

It is desirable to utilize the engine lubrication oil for cooling of the generator and, at the same time, bring the oil only into contact with bearings and seals and tubes of the type encountered in the engine gearbox.

SUMMARY OF THE INVENTION

In this invention, by provision of an absolute containment of the eutectic material, the eutectic material is always prevented from entering the engine oil cooling system. It is through containment of the melted eutectic by a positive means that it is now possible to utilize the engine oil directly, and to avoid reliance upon secondary oil systems for supplying lubrication to the generator drive shafts.

In this invention, there is provided a cavity or chamber within the output end of the drive shaft for containment of a eutectic material which has melted. Centrifugal force is relied upon to throw the eutectic material into the cavity. In addition to the use of the cavity, there is also provided a further positive means of containing the eutectic fluid material. This means is a seal which engages a flange on the central drive shaft when the eutectic collapses for the purpose of preventing any flow of eutectic material out of the containing cavity and into the region wherein the engine oil lubrication is supplied to the generator splines.

In high speed generators, there is a flow of oil across the splines which connect the drive shaft to the torque receiving means or generator. The area surrounding the splines must be substantially full of oil, in order that there be adequate lubrication across the faces of the splines at high speeds.

Absolute assurance of prevention of any eutectic element from entering the oil makes it possible to utilize variable speed, constant frequency generators which are directly cooled by the engine cooling oil. It has also been found that, in order to prevent damage to the oil itself, the eutectic element should melt at 354° F.±5° F. With this limitation, a malfunction in the generator will not overheat and cause degradation of the engine oil supply prior to the disconnecting of the generator drive shaft.

BRIEF DESCRIPTION OF THE DRAWINGS

FIG. 1 shows the shaft assembly in the operating mode.

FIG. 2 shows the shaft assembly where the eutectic element has melted and is contained.

DESCRIPTION OF THE PREFERRED EMBODIMENT

In the preferred embodiment as depicted in FIG. 1, the eutectic element 44 is located within the splined output shaft 15. The lubricating and cooling oil from the aircraft engine flows in the area around the spline, and is in contact with end of center shaft 30. The heat of the oil is conducted through end 31 to the eutectic element 44. In this manner, the eutectic element is sensitive to the temperature of the lubricant, and, in the case of a variable speed, constant frequency generator application, this fluid transmits the generator heat to the eutectic element. When the generator heat becomes excessive, the oil heat rises to a temperature greater than 354° F.±5° F. In this manner, the location of the eutectic element proximate to the generator oil flow makes the disconnect sensitive to the generator operating conditions.

In specific reference to FIG. 1, there is shown a thermally fuzed drive shaft assembly 10 which provides a torque disconnect to a generator assembly generally depicted as 24. There is a spline 12 on the input of the drive shaft, and this spline is used to connect the drive shaft to the torque supply. The spline 12 along with the engine or input drive shaft 20 constitute the first means for connecting to a torque supply. The torque supply 74 is any appropriate drive gear from the aircraft engine.

A second spline 14 on the output portion of the drive shaft assembly 15 connects the output portion 15 to an internally splined generator shaft 24, or a torque receiving means. This spline connection 14 requires oil lubrication substantially throughout the area it occupies. The spline 14 constitutes the means for connecting the drive shaft assembly to the associated torque receiving means or generator.

The drive shaft assembly also contains gearteeth 16 on drive shaft input portion 20 and gearteeth 18 which comprise an input into the output portion 15. Together gearteeth 16 and 18 provide the means for mechanically disconnecting the two drive shaft elements. When these gears are parted, independent rotation is permitted between the splined input member 20 and the output member 15.

As can also be seen in FIG. 1, there is a central shaft 30 which extends entirely through the drive shaft assembly. The central shaft drive assembly is secured by lock nut 36 at one end and has at its other end a radial flange or parallel end face 50 which abuts the eutectic material 44. The central shaft also has a bellville washer 38 which provides part of the bias means against the eutectic element 44. The element 44 is made of eutectic material and is the thermal fuze. This thermal fuze 44 is cylindrical in shape and is locked in compression by the flange or parallel end face 50 of central shaft 30. The locking means for the central shaft also includes a wear washer 37 for application of pressure to the bellville washer 38.

Also attached to the center shaft 30 is a sealing, radially extending flange 34 which is a seal member for the cavity 40 within the output portion of the drive shaft 15.

The cavity 40 in the output portion 15 provides for containing the eutectic material when the eutectic material melts. There is a flange 43 which forms one wall of the cavity 40 and which extends inwardly toward the shaft 30. By this construction, there is created a radially extending cavity 40 within the output member 15. As the eutectic material melts, it is thrown outwardly into the cavity 40 due to rotation of the shaft 30, as well as the rotation of the output portion 15. In this manner, the loose eutectic material will be additionally confined by the flange portion 43.

A seal member 42 is positioned against the flange 43 of the output portion 15. When the eutectic material 44 melts, the parallel end faces 48 and 50 move together as the output portion 15 moves away from the input drive shaft portion 20 in response to the force exerted by bellville washer 38 and bellville spring package 62. This movement is responsive to the combined bias means of the bellville washer 38 and the compression bellville spring package 62.

When the output portion 15 moves along shaft 30, seal 42 engages the radial flange or seal member 34 to completely stop any escape of eutectic material from the cavity portion 40. This seal 42 is the eutectic cavity seal means. Together, the radial flange 34 and the seal member 42 combine to form the moveable seal means as the output portion 15 moves along shaft 30 to produce the engagement of the seal.

In order to maintain the position of the output portion 15 with respect to the shaft 30, a bearing 52 is provided. Directly behind this bearing 52 is an o-ring 69 which also serves to prevent loss of eutectic material which might otherwise run up the shaft 30 toward the input drive shaft 20. The eutectic member itself includes wire columns 58. These wire columns provide the support against the compression forces exerted by bellville washer 38 and bellville spring package 62 until the lateral support is removed from these wires through melting of the eutectic materials.

At the end of the output portion of the drive shaft, a bumper 60 is used to retain the assembly against axial movement. The centering of the drive shaft is achieved, not by any bearing within the generator, but by controlling the splines 14. By proper machining of the splines 14, the drive shaft is centered within the internally splined generator drive shaft 24.

The bellville spring package 62 is provided with a wear washer 63 at the input shaft end 20 and there is a roller bearing 39 between the drive shaft 30 and the input drive shaft portion 20. The drive shaft 30 will independently rotate with respect to the input drive shaft 20 even after the eutectic material has collapsed and the output drive shaft 15 is disconnected from the input through separation of the gears 16 and 18. By this independent rotation, shaft 30 may rotate with shaft 24, thereby eliminating relative movement and friction at the seal 42 and flange 34 when sealed as in FIG. 2.

Means for providing oil lubrication to the spline portion 14 is by lubrication hole 70 which supplies oil to this portion of the assembly and exit hole 72 along with exit 73.

The majority of the oil passes across the splines 14 into the dam region 68 and then to exit 73. The dam does not seal the oil, but rather allows the oil to pass freely with some restriction to the area beyond. The dam portion 68 is required because the speeds of rotation in the order of 21,000–27,000 rpm require that the area around the splines 14 be substantially filled with oil. If the dam 68 were removed, there would be insufficient lubrication in the spline area and consequent wear and galling of the splines. The dam 68 along with the oil entrance point 70 and the oil exit 73 combine to form the means for oil lubrication of the splines 14. Further, this oil also provides heat to the central shaft 30 as well as the output portion 15, and, if this heat exceeds the predetermined amount (such as 354° F.), the melt of the eutectic material results. The melting temperature of the eutectic is generally chosen to be compatible with the oil so that there is no risk of oil breakdown due to overheating of the generator or driven element.

In FIG. 2, there is shown the shaft and its disconnected configuration with the eutectic fuze material melted. The wires 58 are shown in their collapsed position, and the radial flange 34 on the shaft 30 is shown collapsed against the seal 42. When the shaft is in this position, the bellville spring package 62 is extended, and the gearteeth 16 and 18 are parted, thereby disconnecting the drive to the spline 14 from the spline 12. As can be seen, the seal against leakage of eutectic material is always maintained by the pressure exerted by bellville spring package 62 which acts against the output drive shaft 15, thereby producing a sealing pressure between seal 42 and flange 34. In the embodiment shown, when the thermally fuzed drive shaft 10 is disconnected, the center shaft 30 is independent and may rotate with respect to input shaft 20 or the first means for connecting to the torque supply. The bearing 39 positions shaft 30 with respect to input drive shaft 20 and permits the relative rotation.

Any changes, modifications, alterations and other uses or applications which do not depart from the spirit and scope of this invention are deemed to be covered by the invention, which is limited only by the scope of the claims which follow.

What is claimed is:

1. In a torque disconnect means having a first means for connecting to a torque supply, second means for connecting to torque receiving means, third means for providing oil lubrication between said second means and said torque receiving means, fourth means for connecting and disconnecting said first and second means in torque transmitting relationship, said fourth means including bias means, tending to force said first and second means to disconnect positions and a thermal fuze loaded in compression by said bias means, said thermal fuze including a body having opposite, parallel abutment faces to which said bias means apply the compressive load, said thermal fuze body being constructed of fuze material which remains solid up to a predetermined temperature and a plurality of columnar supporting members which extend perpendicular to and between said abutment faces, whereby said fuze material prevents columnar bending of said supporting members until the predetermined temperature is reached, at which time the compressive load fails said supporting members in columnar bending so that said thermal fuze no longer resists said bias means, thereby allowing said bias means to disconnect said first and second means, the improvement comprising:
    fifth means for containing said fuze material within a confined area, whereby said fuze material is prevented from contaminating said oil lubrication between said second means and said torque receiving means.

2. The torque disconnect means as defined in claim 1 wherein said means for containing said fuze material is a cavity in said second means for connecting to a torque receiving means and a moveable seal means.

3. The torque disconnect means as defined in claim 1 wherein said means for providing oil lubrication comprises an oil intake port and an oil exit means which is arranged to maintain full flow across the connection between the said second means and said torque receiving means.

4. A torque disconnect means as defined in claim 1 wherein said fifth means include a moveable seal means comprising a radial flange mounted on a center shaft which engages a flange on said second means to seal said cavity when said fuze material reaches a predetermined temperature, and said first and second means are disconnected.

5. A torque disconnect means as defined in claim 4 wherein said center shaft is free to rotate with respect to said first means for connecting to a torque supply when said first and second means are disconnected.

6. A thermal fuze mechanical disconnect having first means for connecting to a torque supply, second means for connecting to torque receiving means, a eutectic fuze element which melts at a predetermined temperature and means for mechanically disconnecting said first and second means when said eutectic fuze element melts, the improvement comprising:
    a cavity within said second means for containing said eutectic fuze material which has melted, and
    moveable seal means for sealing said cavity and preventing said eutectic fuze material from escaping said cavity, whereby said eutectic fuze material is prevented from contaminating said lubricating oil.

* * * * *